Oct. 24, 1967  A. BROTHMAN ET AL  3,348,559
ELECTRONIC GOVERNOR
Filed April 7, 1964  4 Sheets-Sheet 2
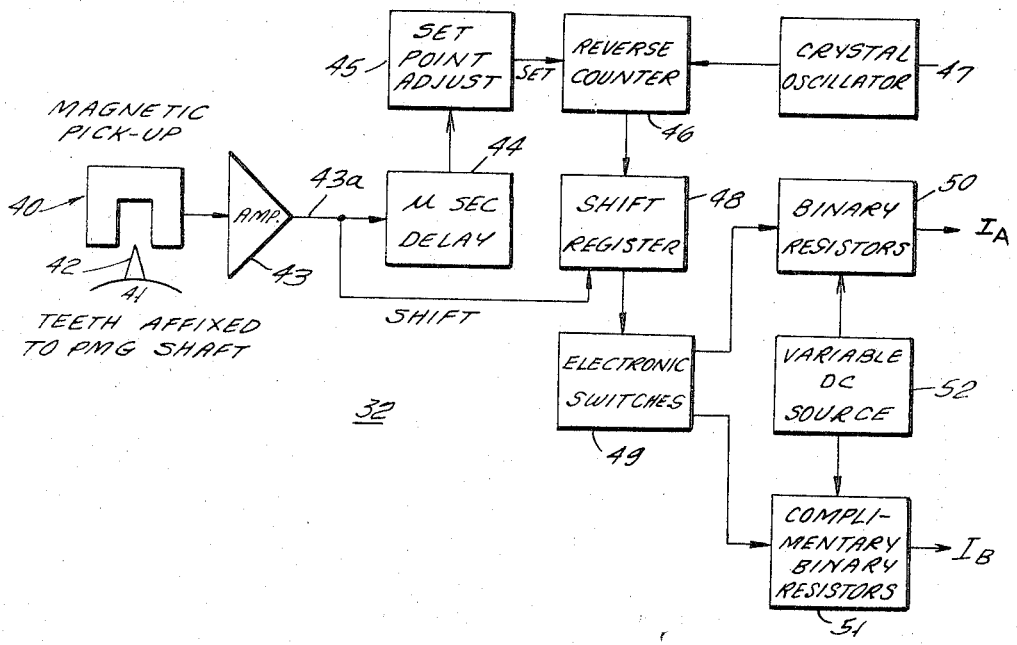
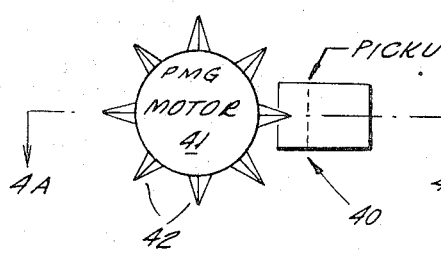
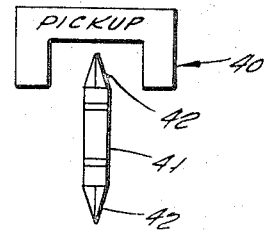
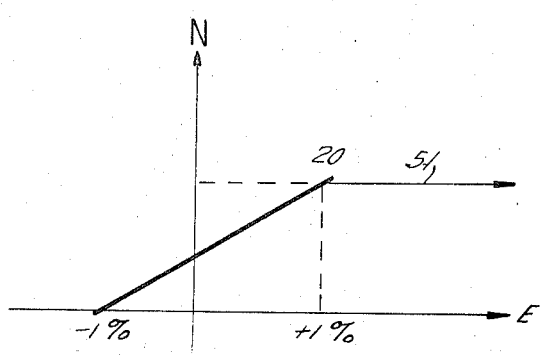
INVENTORS
ABRAHAM BROTHMAN
LEE M. HOROWITZ
BY
OSTROLENK, FABER, GERB & SOFFEN
ATTORNEYS Oct. 24, 1967  A. BROTHMAN ET AL  3,348,559
ELECTRONIC GOVERNOR
Filed April 7, 1964  4 Sheets-Sheet 3
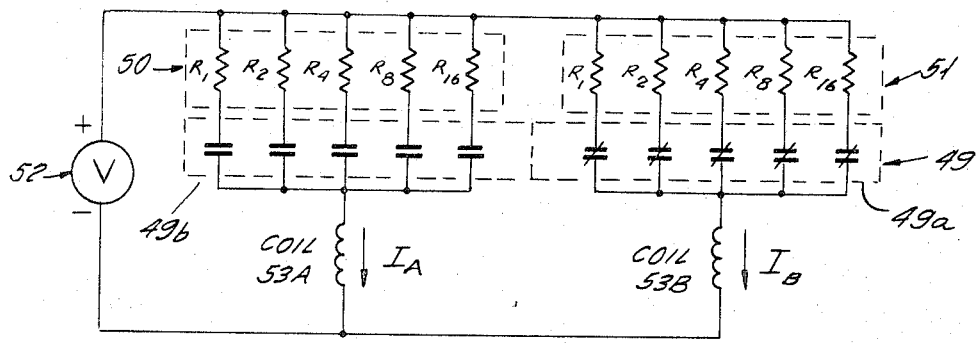
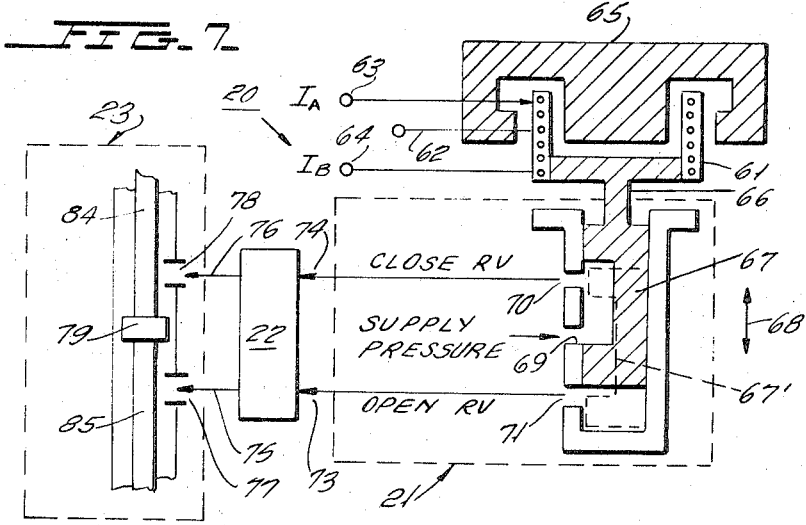
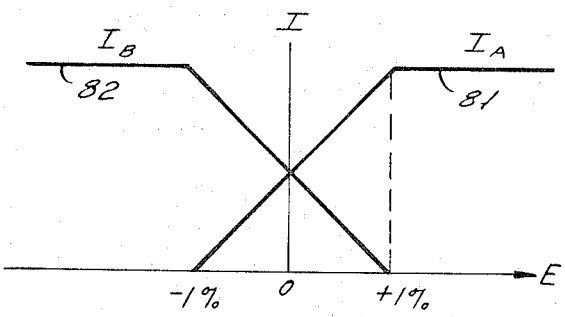
INVENTORS
ABRAHAM BROTHMAN
LEE M. HOROWITZ
BY
OSTROLENK, FABER, GERB & SOFFEN
ATTORNEYS

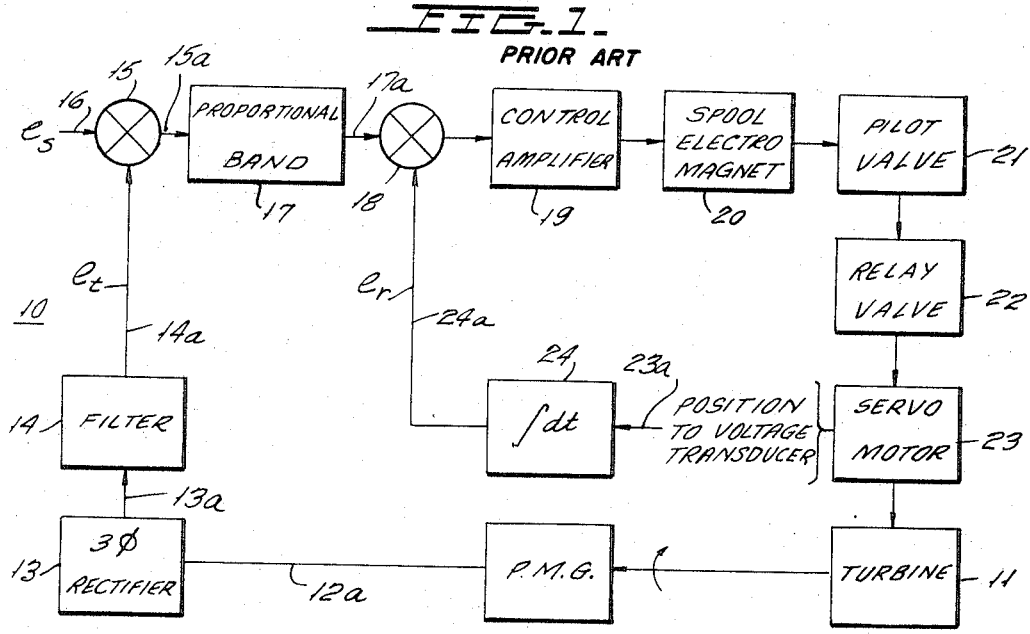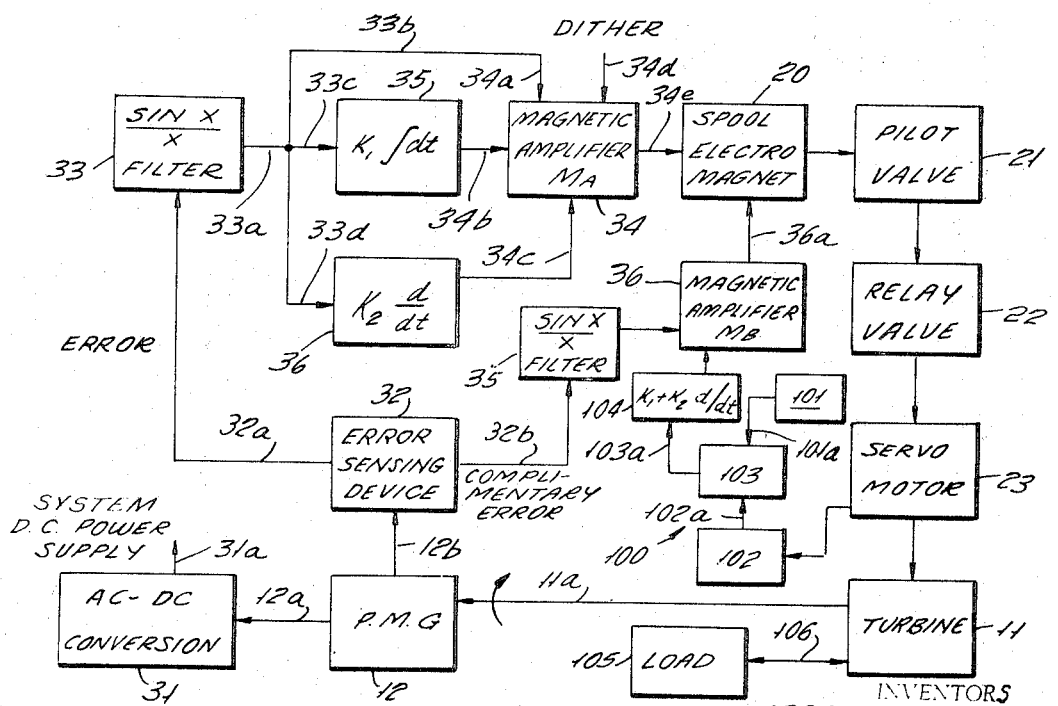

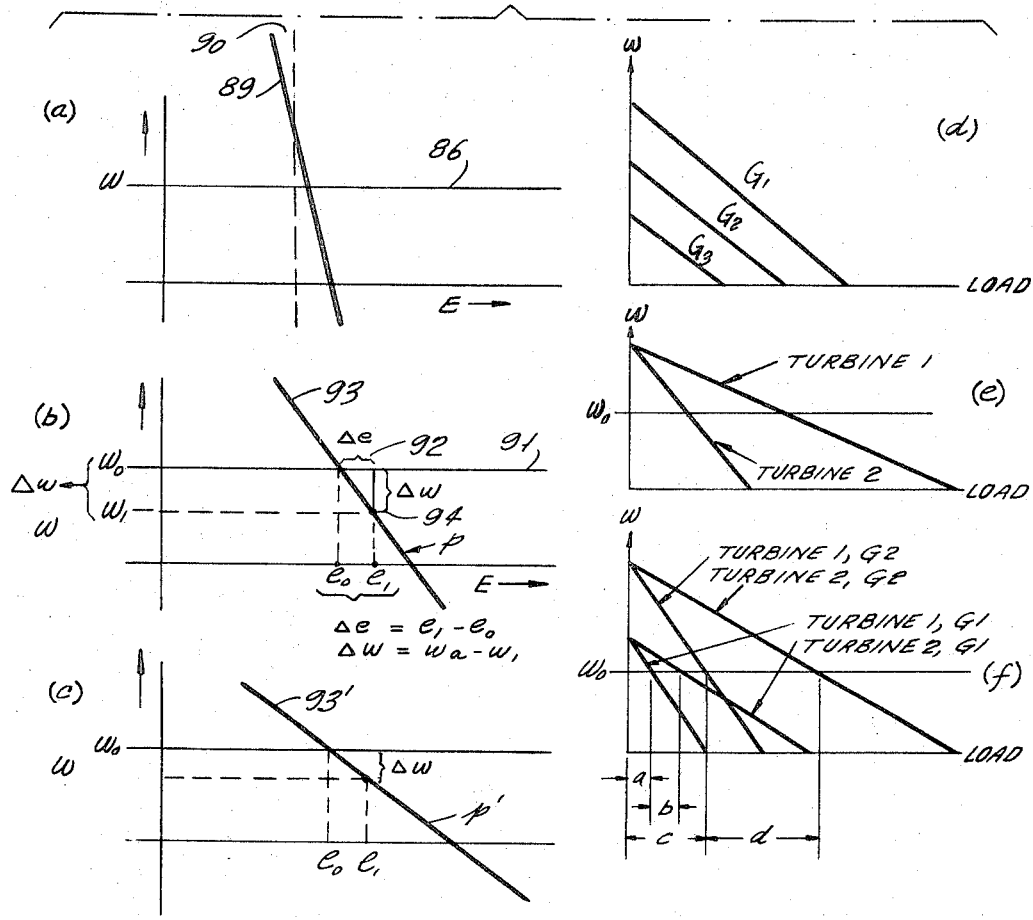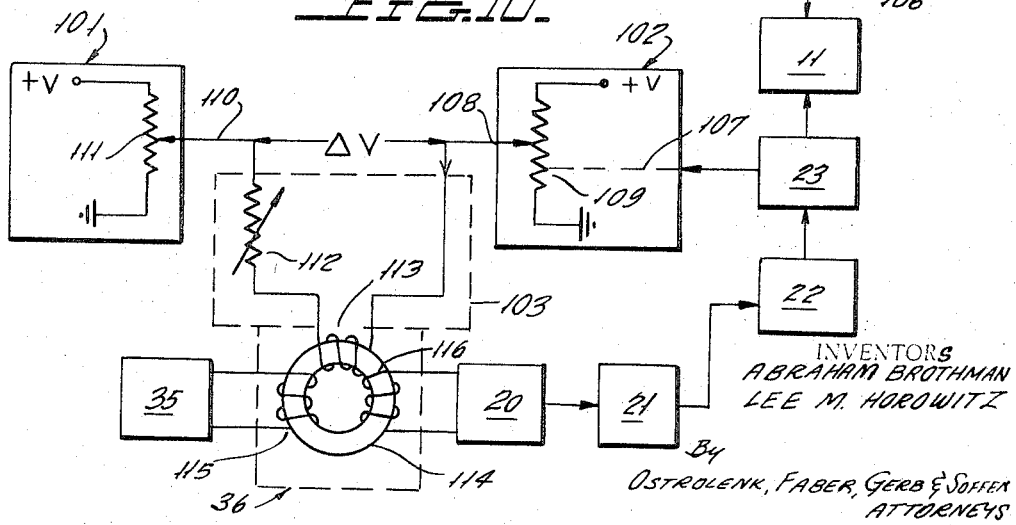

United States Patent Office 3,348,559
Patented Oct. 24, 1967

3,348,559
ELECTRONIC GOVERNOR
Abraham Brothman, Dumont, and Lee M. Horowitz, Cedar Grove, N.J., assignors, by mesne assignments, to Baldwin-Lima-Hamilton Corporation, Philadelphia, Pa., a corporation of Delaware
Filed Apr. 7, 1964, Ser. No. 357,988
12 Claims. (Cl. 137—30)

The instant invention relates to control systems and more particularly to an automatic valve servo means for continuously adjusting a turbine so as to maintain the operation of the turbine at a predetermined constant speed.

A variety of schemes have been developed and are presently in use for the purpose of maintaining a turbine at a constant operating speed. One typical present day approach is the Pelton electric governor system. In the Pelton system the rotating turbine is coupled to generator means which converts the turbine rotation into a varying voltage signal. This signal is then suitably rectified and filtered in order to provide a DC signal which is proportional to the rotational velocity of the turbine. The DC signal is compared with a set point voltage which represents the speed at which the turbine should be operating. The comparison circuit generates an error signal which is then summed with an automatic reset signal to derive a signal for controlling the valve means which regulates the flow of fuel to the turbine, thus controlling the speed of the turbine. The position of the servo motor means is sensed by a position to voltage transducer which converts the servo motor position to an output voltage, which output voltage is the automatic reset voltage summed with the resulting error signal.

The above system has numerous disadvantages in that the system is not capable of controlling the speed of the turbine to an accuracy of ±0.01%; the system is extremely sensitive to thermal effects; and the filtering of the DC voltage, which is proportional to the speed of the turbine, introduces extremely large errors into the control system, thus greatly affecting its accuracy.

The instant invention provides a system capable of alleviating all of the disadvantages of prior art system and particularly of the Pelton system described above, while at the same time being capable of controlling the turbine speed within a tolerance of ±0.01%.

In the system of the instant invention, the generator means connected to the turbine output generates an AC voltage proportional to turbine speed and this voltage is then rectified and filtered to provide a DC voltage. However, this DC voltage is used as the power supply means for the system of the instant invention and is not employed as the DC voltage which is proportional to turbine speed and which is compared with the set point voltage as was the case in the previously described prior art system. In the instant invention, the generator means operating speed is sensed by error-sensing means which operate in such a manner as to develop a digital output representative of the deviation between the generator means rotating speed and the set point for the turbine.

This digital information is then converted into an analog voltage. This analog voltage is connected through a first channel, or path, where it is filtered and then amplified. The filtering operations are arranged so as to greatly increase the response of the system to transient signals. The analog error voltage follows a second channel, or path, in which it is first inverted so as to form a complementary error signal, which complementary signal is then filtered and amplified. The two separate paths of the error signal form the inputs of a push-pull solenoid means employed to control the valve means, which in turn controls the flow to the turbine.

The instant invention has the distinct advantages over prior art system in that the servo means of the instant invention, which form part of the relay means circuit, is not employed at all to provide an automatic reset action. A digital sampling system having extremely high operating speeds relative to the rotational speeds of the turbine is employed, thus enabling the sensing of speed error of the turbine at 0.01% tolerances or better to be obtainable and the system is further more sensitive to any transient signals which may be generated.

The digital error-sensing means of the instant invention is further comprised of means to sense the rotational speed of the generator means which is operated by the turbine and converts this speed indication into a plurality of pulses per revolution of the generator means shaft. Oscillator means, operating at a relatively high frequency, is employed to step reversible counter means. Set point means sets the counter means at the receipt of each pulse from the speed sensing means so that the reversible counter means having been set, the count is reduced by the number of pulses generated by the high frequency oscillator means during the time between adjacent pulses generated by the speed sensing means. The total number of counts remaining in the reversible counter means, after each pulse of the speed sensing means, represents the speed error of the turbine. The count remaining in the reversible counter means is shifted to suitable memory means, releasing the reversible counter means for the generation of a count for the next subsequent operation. The count of the shift register (memory) means is then converted from digital form to an analog voltage by suitable electronic switches and a resistor matrix so as to generate an analog voltage signal and a complementary analog voltage signal, which signals are employed in the manner set forth above, for the purpose of controlling the system relay means to ultimately control the speed of the turbine. This arrangement has the advantage of providing extreme accurate sensing voltages due to the high operating frequencies and accompanying accuracy of the oscillator and counter means which are presently available in the electronics field. The stability and accuracy of these electronic devices are also extremely high, thereby enabling the extremely small tolerances of operation to be readily achieved.

In addition to providing adequate speed control means, it is further significant to provide suitable means for adjusting the amount of a load increase or decrease which a turbine may accept when operating in an over-all system. For example, in a system where only one turbine is employed, it can be shown that the amount of energy developed by the turbine is related to the operating speed (i.e. angular frequency) by a constant of proportionality which may be drawn as a straight line having a negative slope. The value of the constant in proportionality, or the slope of the line, depicts the relationship between energy developed and turbine speed. For example, if energy developed by the turbine increases, the slope represents the amount by which the angular frequency of the turbine will decrease. This is relatively well known in turbine characteristics, with increased turbine load acting to cause a reduction in turbine angular velocity with all such changes lying along the load line. The slope of the load line determines the percentage change which occurs. In a pure speed control system, the load line is perfectly horizontal, such that any changes whatsoever in the energy being taken from or returned to the turbine has no effect whatsoever on angular frequency of the turbine. This is a pure speed control system. In the case where the load line is substantially vertical, any extremely minute change in energy withdrawn from or returned to the turbine results in extremely large angular velocity changes.

As can be appreciated, typical load lines which may be practically realized lie within these two extremes.

Turning to the instance where a system may be comprised of two such turbines feeding a load network, it is highly desirable to provide the ability to regulate the amount at which the turbines will adjust to accept some portion of the change in energy being required by the load. For example, if both turbines have the same generating capacities and have the same identical load lines, any change in the energy requirements of the load which they feed will be assumed and taken up equally by the two turbines. By altering the load line of one or the other, or both, of the turbines, the amount of energy change accepted by the turbines may be considerably altered from an even split of the energy requirements therebetween.

Present day systems require operators to perform two adjustments in order to alter the slope of the load line for re-apportionment of the percentage of energy which the machines in the network will assume. These adjustments take place in the hydraulic gain of the mechanical servo system and in the speed set point at which the mechanical servo system operates. These adjustments are not completely independent of one another and require the operator to "zero in" by manipulating the controls in alternating succession in order to arrive at the desired percentage droop for each of the turbines in the network. It should be understood that the normal situation encountered and practiced is a system or network containing a large number of turbines substantially greater than two in number and the number of controls which must then be manipulated becomes quite significant.

The instant invention provides an arrangement which takes the form of an additional servo loop and which enables control of the energy demands assumed by each turbine and the percentage permanent droop by means of independent adjustments.

The single control means of the instant invention is comprised of position-to-voltage means coupled to the turbine gate means which controls the amount of water or steam permitted to flow to the turbine. The gate position, which is now converted to a voltage level provides an indication of the energy being developed by the turbine. A closing of the gate indicates that the load imposed upon the turbine is diminishing, while an opening of the gate means an increased demand for energy by the load upon the turbine. Sensing means are provided for sensing the voltage level of the gate position-to-voltage conversion means and a set point voltage level in order to develop a signal, which signal acts to provide an indication just as if there was a speed change in the turbine. This signal is multiplied by a suitable adjustable constant to develop an input signal to the hydraulic servo loop to operate the turbine gate means and hence the turbine itself, adjusting the position of the gate so as to bring it toward its nominal set point value. The circuit constant multiplying means is comprised of suitable adjustable impedance means for converting the change in the transducer output voltage into a current signal having a magnitude determined by the magnitude of the impedance means and the change in the analog voltage, which current signal is utilized to readjust the turbine gate position to return it to the set point of the system. The impedance means is adjustable and being directly proportional to the percentage droop, enables the percentage droop to be automatically adjusted by a change in the magnitude of the impedance.

It is therefore one object of the instant invention to provide novel control means for regulating the speed of turbines and the like.

Another object of the instant invention is to provide novel electronic control means for regulating the speed of turbines and the like within operating tolerances of ± 0.01%.

Another object of the instant invention is to provide novel electronic control means for regulating the speed of turbines and the like which is comprised of digital error sensing means employed for generating the error signal which is used to adjust turbine speed.

Still another object of the instant invention is to provide novel electronic control means for regulating the speed of turbines and the like and comprising novel error-sensing means which generates a digital output representative of the speed error, which output is then converted into an analog output which is used to adjust the turbine speed.

Still another object of the instant invention is to provide novel electronic control means for use in regulating the speed of turbines and the like comprising novel error-sensing means which generates a digital output representative of the speed error, which output is converted into complementary analog outputs employed to adjust the turbine speed.

Still another object of the instant invention is to provide novel electronic control means for use in regulating the speeds of turbines and the like comprising novel error-sensing means which generates a digital output representative of the speed error, which output is converted into complementary analog outputs employed to operate push-pull valve means, which in turn adjust the operating speed of the turbine.

Still another object of the instant invention is to provide novel electronic control means for regulating the speed of turbines and the like comprising novel error-sensing means which generates first and second complementary error signals of the analog type and which is provided with means for filtering the error signal so as to increase the response of the system to transient signals.

Another object of the instant invention is to provide novel electronic control means for regulating the speed of turbines and the like comprising novel means for sensing the turbine speed and having converter means for converting the speed indication into first and second complementary error signals of the analog type which are used to adjust the speed of the turbine.

Still another object of the instant invention is to provide novel electronic control means for controlling the energy generated and percent permanent droop of turbines by novel sensing means necessitating only one adjustment for controlling both variables.

Another object of the instant invention is to provide novel electronic control means for pure speed regulation and for gate position and permanent percentage droop control within one servo system.

These, as well as other objects of the instant invention will become apparent when reading the accompanying description and drawings in which:

FIGURE 1 is a block diagram showing the Pelton system.

FIGURE 2 is a block diagram of an electronic control system designed in accordance with the principles of the instant invention.

FIGURE 3 is a block diagram showing the error sensing device of FIGURE 2 in greater detail.

FIGURE 4 is a plan view showing the generator means rotor and pick-up of FIGURE 3 in greater detail.

FIGURE 4A is an end view of the rotary pick-up of FIGURE 4.

FIGURE 5 is a plot showing the relationship between the counter reading of the counter means of FIGURE 3 plotted against speed error.

FIGURE 6 is a schematic diagram showing the electronic switching means of FIGURE 3 in greater detail.

FIGURE 7 is a cross-section view of the push-pull solenoid means of FIGURE 2.

FIGURE 8 is a plot showing the relationship of the complementary analog current signals to turbine speed error.

FIGURE 9 shows a plurality of graphs presented for the purpose of explaining the operation of the servo loop of FIGURE 10.

FIGURE 10 is a schematic diagram showing one servo loop of FIGURE 2 in greater detail.

Referring now to the drawings, FIGURE 1 shows a control system 10 which is heretofore identified as the Pelton electric governor system. The system 10 of FIGURE 1 is comprised of turbine means 11, having its rotational output 11a coupled to a permanent magnet generating means 12. The permanent magnet generating means 12 generates an A.C. voltage which is proportional to the rotating speed of turbine 11. This voltage appears at 12a and is impressed upon three-phase rectifying means 13 to develop a D.C. output voltage. This D.C. output voltage appears at 13a and is impressed upon filter means 14 so as to filter out high frequency components and thereby smooth the D.C. voltage signal. This signal appearing at 14a is a D.C. voltage, which is proportional to the rotating speed of turbine 11 and is identified by the symbol $e_t$. This analog voltage $e_t$ is impressed upon suitable error summing means 15, where it is compared with a set point voltage $e_s$ impressed at 16. The set point voltage $e_s$ is a voltage representative of the operating speed of turbine 11. Any deviation from the desired turbine speed thereby causes a deviation or difference to exist between the set point voltage $e_s$ and the D.C. speed voltage $e_t$, thus generating an error signal at 15a.

The error signal is impressed upon a proportional band amplifying means 17, which acts to amplify the error signal within a predetermined voltage band. The amplified error signal appears at 17a and is impressed upon a second summing means 18, similar to the summing means 15. The amplified error signal is added to an automatic reset signal $e_r$ appearing at the output 24a. The resulting signal is impressed upon a control amplifier 19, which in turn, drives a spool electro magnet 20. The spool electro magnet 20, in turn, operates the pilot valve 21, relay valve 22 and servo-motor 23, in order to exercise control over the hydraulic portions of the system to so control the turbine speed. The servo-motor 23 reacts to the relay valve means 22 in such a way as to generate a voltage representative of the position of relay valve means 22, which voltage appears at 23a. This voltage is then suitably integrated in circuit 24 so as to provide the automatic reset signal $e_r$ at 24a.

Some of the weaknesses of such a system are:

(1) The use of the output of the servo-motor 23 for feed-back usually requires high precision position-to-voltage transducers.

(2) The speed of the turbine 11 must be controlled to an accuracy of ±.01%. The error sensing device must therefore be able to detect a ±.01% time variation in the period of one cycle. Since it is a sixty cycle voltage sine wave which we wish ultimately to control, it therefore follows that for ±.01% accuracy, we need the equivalent of 10,000 clock pulses per cycle or 60,000 clock pulses per second. The theoretically smallest distinguishable interval obtainable, however, is the "Nyquist Interval" which is one-half cycle of the carrier frequency. In this case, the carrier frequency is the frequency of the voltage output of the permanent magnet generator, which is at best twenty cycles per second. Therefore, from a theoretical point of view, these frequencies are not capable of providing the information necessary to control the process with an accuracy of ±.01%.

(3) The outputs of the permanent magnet generator, the rectifier and the filter will be sensitive to thermal effects.

(4) The proper functioning of the system under discussion requires a D.C. voltage proportional to the speed. In order to produce a good D.C. signal from the sinusoidal output of the permanent magnet generator, it is necessary to recitfy the output of the permanent magnet generator and to subject it to heavy filtering.

All real filters have some ripple (that is, some components of frequency higher than D.C.) in their outputs. Ripple typically contains low frequency components. This is also known as "noise."

Let it be assumed that there were such a thing as a perfect measurement signal. This signal would vary slowly as the system tends to move away from its set point and would return as the process responds to the instructions of the controller. Thus, the normal servo operation produces a low frequency variation in measurement signal (process ripple) all its own. The process ripple is indistinguishable from the noise ripple which must be present.

If an attempt is made to filter out the noise then it follows that the process ripple will also be filtered out and no information will remain. If no attempt is made to remove noise is made, then the servo will respond to the noise as if it were a proper measurement signal and accuracy and stability are sacrificed.

(5) The effects upon the permanent magnet generator output 12a of vibration and shock are not known.

(6) It can be shown that the accuracy of a measurement may be improved by averaging a number of such measurements. It is the use of this principle which is implicit in the use of a filter, since a filter is a device with "memory." That is, it responds not only to its instantaneous input, but also to its past inputs. In a sense, a filter can be said to "average." The accuracy obtainable is a direct function of the number of measurements averaged, but since we recall that a new measurement may be made no more often than once every half cycle of carrier (Nyquist Interval), we must realize that meaningful improvement of accuracy requires large time constants. However, if the filter time constant is large, then the measurement average may not be sufficiently contemporaneous to the process for good control.

(7) Even if heat compensation networks of bridged thermistors were to be employed, each such thermal compensating circuit must be "hand tailored" to the specific components of a specific job. Additionally, compensation circuits for use with continuously variable output devices become highly complex compared to simple compensation networks used for constant outputs.

The instant invention is shown in FIGURE 2 and is comprised of a control system 30 wherein like elements are designated with like numerals. The system 30 of FIGURE 2 is comprised of a turbine 11 having its rotational output 11a coupled to the input of the permanent magnet generator means 12, which is controlled to rotate in unison with turbine 11. One output 12a of generator means 12 is impressed upon A.C. to D.C. conversion means 31 so as to develop a D.C. power supply signal at 31a, which signal is employed as the D.C. supply means for the system 30. The second output of the generator means 12 is provided at 12b and is impressed upon error sensing means 32, which is set forth in greater detail in FIGURE 3. For an explanation of the system 30 of FIGURE 2, however, it is sufficient to understand that the error sensing means 32 senses the speed of permanent magnetic generating means 12 and develops first and second complementary error signals at 32a and 32b, respectively, which signals are of the analog type and are representative of turbine speed. The first signal, or error signal 32a is impressed upon a $$\frac{\sin x}{x}$$

filter circuit 33, which is employed to operate as a holding circuit means. The filtered output appearing at 33a divides into first, second and third paths 33b, 33c and 33d. The path 33b directly connects the output of filter 33 to one input of magnetic amplifier means 34. The path 33c connects the output of filter 33 to integrating means 35, which acts to integrate the signal at 33a and impress the integrated signal upon a second input of magnetic amplifier 34. The third path 33d connects the output of filter 33 to a differentiation circuit 36, which differentiates the output signal of filter 33 and impresses it upon a third input of magnetic amplifier 34. The three separate paths are employed for the purpose of substantially improving the transient response of the magnetic amplifier means 34 and hence of the system 30, by virtue of impressing the error signal itself, plus the error signal in its integrated form and in its differentiated form upon the individual inputs, 34a, 34b and 34c, respectively, of the magnetic amplifier 34. The resultant amplified output signal 34e is impressed upon one input of the spool electro magnet 20.

The complementary error signal generated by error-sensing device 32 and appearing at 32b is impressed upon a second $$\frac{\sin e\ x}{x}$$

filter 35. The output of filter 35 is impressed upon a second magnetic amplifier means 36, thereby impressing the amplified complementary error signal upon a second input of spool electro magnet 20 through the output 36a.

While the spool electro magnet 20 is described in greater detail with reference to FIGURE 7 of the instant application, it is sufficient for purposes of describing the system 30 of FIGURE 2, to understand that the spool electro magnet is basically a push-pull solenoid arrangement, thus operating in a reciprocating fashion in order to control the pilot valve 21 and relay valve 22 in a two-direction fashion, enabling the servo-motor 23 to ultimately regulate the turbine 11 so as to bring the turbine either up to the desired operating speed or down to the desired operating speed, depending upon whether the speed error is negative or positive, respectively.

The two systems 10 and 30 (of FIGURES 1 and 2) differ in the following major respects:

(1) The system 30 does not derive the automatic reset action from the output of the servo motor.

(2) The system 30 includes an error sensing means having an explicit rate action not included in the system 10.

(3) The system 30 uses a digital error sensing device with an implicit proportional band action.

(4) The voltage output of the permanent magnet generator 12 is not used as a speed indication. The speed signal is derived directly from the mechanical rotation of the permanent magnet generator shaft.

With these changes, the system 30 avoids the difficulties of the system 10 set forth above.

In the system 30, the necessity for high precision transducers (servo means 23) is eliminated by deriving the automatic reset action from the error signal.

*Error sensing device—General theory*

The digital error detector 32 counts the pulse outputs of a high accuracy clock means between gating signals generated by the passing of gear teeth (attached to the permanent magnet generator shaft) through the air gap of a magnetic "pick up" unit to be more fully described.

The digital outputs of the error sensor are converted to an analog current signal through switching actions which will be described later.

The accuracy available from the digital error sensor will depend upon:

(1) the accuracy and stability of the clock means
(2) the number of samples available per revolution
(3) the number of clock pulses available per gating interval
(4) the accuracy of alignment of the gear teeth.

Of all of the above, it is the mechanical tolerance of the gear teeth which will most limit the available accuracy. Because of the limit to directly obtainable accuracy, the system of the invention can filter and average so as to respond to the envelope of the error signal.

The digital to analog conversion (explained more fully later) yields an output in the form of step functions whose amplitudes are proportional to error. Step functions contain high frequency components which must be removed to produce a smooth, continuous error signal. The frequency components belonging to the step functions themselves, as opposed to the envelope of the amplitudes, can be considered noise. In this case, however, a greater proportion of the noise is actually distinguishable from the signal (because of its higher frequency) and can thus be removed yielding a higher signal-to-noise ratio.

The input marked "dither" on the system diagram 30 and impressed at input 34d of magnetic amplifier 34 is a sinusoidal signal. It is possible to prove mathematically that this signal reduces the loop gain to the level required for stability by the Routh-Hurwitz Criteria. The frequency of the dither signal acts as a fine adjustment to the loop gain with the "dither" signal being able to adjust the gain down to the desired magnitude.

The automatic reset is derived from the error signal by the use of an operational integrator.

To compensate for any lags in the system, a rate action, variable within wide limits, is provided. This improves the system's transient response. A description of the functional sub-elements of the control system follows;

*Error-sensing device—Description*

The error sensing device is a sampling device that can detect speed fluctuation of the turbine with a resolution determined by the accuracy of the gear. The components are:

(1) Magnetic pick-up and amplifier
(2) Reversible counter
(3) Crystal oscillator
(4) Solid-state electronic switches
(5) Shift registers
(6) Variable DC source.

The block diagram of the error sensing device 32 is shown in FIGURE 3. The error sensing device 32 is comprised of magnetic pick up means 40 which is arranged to sense the passing through of the magnetic path of the pick up 40 and the teeth 42 which are affixed to the permanent magnet generator saft 41. The magnetic pick up operates in a manner such that when a tooth, such as the tooth 42, is positioned between the arms of the pick up 40, the reluctance of the magnetic path is greatly diminished. When a tooth passes beyond the magnetic path the reluctance of the magnetic path greatly increases. These transitions cause the magnetic pick up means to generate pulses which are employed for the purpose of measuring turbine speed in a manner to be more fully described.

The pulses generated by the magnetic pick up 40 are impressed upon amplifier means 43, which then imposes the amplified pulses at its output 43a simultaneously upon shift register 48 and delay means 44. After a microsecond delay, a pulse generated by the magnetic pick up means 40 causes the set point adjust means 45 to set reversible counter means 46 to a predetermined count. The crystal oscillator means 47, which operates continuously, acts to reduce the predetermined count set in reversible counter means 46 until receipt of the next output pulse from the magnetic pick up means 40. The crystal oscillator means 47 provides a highly stable time base to measure the permanent magnetic generator speed fluctuation within fractional revolutions of the generator means 12. The count of reversible counter means 46 is shifted into shift register means 48 by means of a shift pulse received from the output of amplifier 43a. After a microsecond delay, reversible counter 46 is then reset again to the predetermined count determined by the set point adjust means 45 in order to enable the crystal oscillator means 47 to again reduce the count.

The count now stored in shift register means 48 sets electronic switch means 49 in a predetermined manner, causing the binary resistor circuits 50 and 51 to be set in a manner so as to generate currents $I_A$ and $I_B$, the magnitudes of which represent the speed error of the turbine. The two currents $I_A$ and $I_B$ are complementary error signals, as was previously described. The variable DC source 52, which is the potential supply for the binary resistor circuits 50 and 51 is made adjustable in order to provide adjustable proportional band. The magnitude of a given speed error is hence a function of the value of the variable D.C. source.

Considering the operation in more detail, FIGURE 4 shows the permanent magnet generator shaft 41 being provided with a plurality of substantially equally spaced gear teeth 42. FIGURES 4 and 4a merely show the manner in which the gear teeth 42 pass through the magnetic circuit of the pick up means 40. The teeth 42 are evenly positioned on the circumference of the permanent magnet generator rotor or shaft 41 such that as the permanent magnet generator 12 revolves, the teeth 42 consecutively pass through the magnetic pick up 40. A pulse is then generated at each meeting of the pick up 40 with a tooth 42, due to the changing reluctance of the pick up.

The time duration T between two consecutive pulses generated by the magnetic pick up means 40 is then inversely proportional to the average speed of permanent magnet generator 12. Since the reversible counter means operates as a subtracting device, the reading of the counter means 46 at the end of a counting phase will be $N_0 = N_S - N$. Where: $N$ = the number of pulses generated by the crystal oscillator in T seconds and $N_S$ = a number corresponding to the set point of the reversible counter means 46, which set point is imposed upon counter means 46 by the set point adjust circuit 45. It should be understood that the set point adjust circuit 45 is adjustable so as to set the reversible counter means 46 to any desired predetermined count so as to permit regulation of the turbine at a variety of desired speeds.

As the permanent magnet generator 12 speeds up (i.e. with positive error speed), N will be smaller (the gating time T is shortened). The $N_0$ (the reading of the reversible counter 46) will be larger. The reversible counter 46 is preset to a proper number $N_S$ so that the relation between the reading of counter means 46 and speed error is as shown in FIGURE 5.

Turning to FIGURE 5, there is shown therein a plot 50, in which the total number of pulses N are plotted against the speed error E.

As shown by curve 51:

When speed error is $\geq 1\%$, counter reading = 20.
When speed error is $\leq -1\%$, counter reading = 0.

Between the error bounds, $\pm 1\%$, the counter 46 reading is proportional to speed error. In this fashion, we divide the speed error between $-1\%$ and $+1\%$ into, say, twenty quantized steps, with 0.1% as increment. Errors larger than 1% or smaller than $-1\%$ are clipped automatically.

The binary reading of counter 46 is shifted into the shift register means 48 in the manner described above with register means 48 acting as a memory to store the last developed count in order to permit the next developed count to be initiated. The outputs of register means 48 operate to open or close groups of solid-state electronic switches which, in turn, connect or disconnect resistors to a variable DC source, as shown in FIGURE 6. In FIGURE 6, wherein like numerals represent like elements as between FIGURES 3 and 6, electronic switches are shown at 49, in schematic fashion, wherein the group 49a is represented by the normally closed switches, while the group 49b is reperesented by normally open switches. While these switches are shown in schematic fashion, it should be understood that vacuum tubes, transistors, or any other solid-state device or relay means may be employed to perform the switch functions with solid-state devices being preferred in order to obtain faster switching speeds. Each switch of group 49a is connected to an associated resistor of the binary resistor group 50 and in a like fashion each switch of group 49b is connected to an associated resistor of binary resistor group 50. The resistor switch group 49a–51 is connected in series with a coil 53b of the spool electro magnet 20, which operates in a manner to be more fully described. The second series arrangement is comprised of resistor group 50, switch group 49b and coil 53a of spool electro magnet 20. These two series paths are connected in parallel with one another and likewise in parallel with adjustable voltage source 52. These switch groups 49a and 49b act to collectively insert a predetermined number of the resistors in parallel with one another so as to control the amount of impedance in series with each of the coils 53a and 53b. The coil resistances must be negligible compared to the parallel resistances of the binary resistor groups 50 and 51 in order to insure proper action.

$$E\left(0 \times \frac{16}{R} + 1 \times \frac{8}{R} + 1 \times \frac{4}{R} + 1 \times \frac{2}{R} + 0 \times \frac{1}{R}\right) = 14\left(\frac{E}{R}\right)$$

and $I_B$ will be:

$$E\left(1 \times \frac{16}{R} + 0 \times \frac{8}{R} + 0 \times \frac{4}{R} + 0 \times \frac{2}{R} + 1 \times \frac{1}{R}\right) = 17\left(\frac{E}{R}\right)$$

Since the switches in the $I_B$ circuit are complementary to those of the $I_B$ circuit, the current $I_B$ can be called the complementary error signal. Dead band may be provided by disabling the outputs of the least significant digits.

The coils 53a and 53b are provided as coils on the magnetic amplifiers 34 and 36 of FIGURE 2. The magnetic amplifier 34 is actually provided with four input coils, receiving as inputs the error signal, the differential error (which is the rate action signal), integrating error signal (which is the automatic rest signal) and "dither" signal. The magnetic amplifier 36 receives just the complementary error signal. Utilizing magnetic amplifiers in this manner provides the function of isolating, amplifying and summing the signals impressed upon the magnetic amplifying means.

Both the rate action and the automatic rest signal are applied mainly to achieve better transient response, while "dither" is used as loop gain adjustment in order to obtain a proper stability margin.

*Push-pull solenoid and pilot valve*

The spool electro magnet 20 (or so-called push-pull solenoid) is shown in FIGURE 7, in a cross-sectional view; and is comprised of a coil means 61 having a center tap 62 and two end terminals 63 and 64. Coil 61 is surrounded by a permanent magnet member 65. The coil is likewise coupled to an armature 66 having its lower end 67 forming the pilot valve spool of pilot valve means 21 of FIGURE 2.

The input terminals 63 and 64 receive the complementary error signal currents $I_A$ and $I_B$ and operate such that when any unbalance exists between the currents $I_A$ and $I_B$ the armature 66 becomes adjusted either vertically upward or downward, as shown by the arrows 68. The pilot valve means 21 is provided with a pressure supply source which enters through a port 69. When the spool member 67 is in the solid-line position the supply pressure enters through port 69 and exists through port 70 to operate the relay valve to the closed position. When the solenoid 20 operates to move the spool 67 to the dotted line position 67', the supply pressure enters port 69 and exists through port 71 so as to open the relay valve means 22.

Thus, since the currents $I_A$ and $I_B$ flow in opposite directions in their respective half-coils, they develop opposing forces. If, as previously mentioned, the currents are unbalanced, the spool 67 moves a distance proportional to the difference of the currents. The motion of the spool exerts a valving action at the ports 70 and 71, thereby controlling the "open" and "close" pressures to the relay of valve means 22. The open and close pressures indicated by the arrows 73 and 74, respectively, are impressed upon the input of the relay valve means 22. The relay valve means 22, naturally is an amplifier means in that it imparts hydraulic gain to the fluid pressures 73 and 74. After suitable hydraulic gain is developed, the outputs 75 and 76 of relay valve 22 are impressed into the ports 77 and 78, respectively, of the servo motor 23. Servo motor 23 is in actuality a mechanical servo means provided with a piston 79 mounted to reciprocate vertically up or down and having rods 84 and 85 secured thereto. Depending upon which of the two oil pressures 75 or 76 entering the ports 77 or 78, respectively, is the greater, this determines the amount of upward or downward vertical movement experienced by piston 79. The upward or downward vertical movement imparted to rods 84 and 85, respectively, are employed for the purpose of controlling the flow of steam, or water, into the turbine, thereby controlling the operating speed of the turbine.

Currents $I_A$ and $I_B$ are related to the speed error shown in FIGURE 8. The plot 80 of FIGURE 8 shows curves 81 and 82 of the currents $I_A$ and $I_B$, respectively. From FIGURE 8 it can be seen that at $+1\%$ speed error E the current $I_A$ is at its maximum and the current $I_B$ is at zero, thus causing the spool to move completely under control of current $I_A$. As the percentage error from $+1\%$ decreases towards zero, it can be seen that the current $I_A$ increases linearly simultaneously with the linear increase of the current magnitude of $I_B$. Along the zero axis, it can be seen that the currents balance one another so as to balance the operation of the relay valve means 22. The relay valve, in turn, controls the oil flow to the servo motor 23 which, in turn, operates a needle valve and regulates the speed of turbine 11.

The set point of error sensing device 32, as well as "permanent droop," dead-band and joint load are all variables, as are the gains associated with the proportional band, automatic reset and rate actions of the elements of the system and all of these adjustments may be made from a remote point, thus providing a novel system which can provide a highly accurate and flexible control system operated from a remote point and variable between wide limits and with measurements contemporaneous with the process.

Returning to FIGURE 2, it will be noted that a second servo loop 100 is provided therein for the purpose of controlling the gate position of turbine 11 and the percent permanent droop of the turbine. Before considering FIGURE 2, the purposes of the loop 100 can best be understood from a consideration of the curves shown in FIGURE 9. The graph $a$ of FIGURE 9 is a plot showing energy developed E by the turbine 11 along the $x$ axis and angular velocity being plotted along the $y$ axis. In a servo system, which is a pure speed control system, the curve or horizontal line 86 represents the situation wherein any change in energy E either positive or negative has no effect whatsoever upon angular velocity. The nearly vertical line 89 (which just slightly deviates from a vertical line 90) represents the instance where any small change in energy amounts to a huge change in angular velocity of the turbine.

A turbine working alone will tend to slow down as current is drawn from it. The speed vs. load characteristics is a family of curves $G_1$–$G_3$ (see FIGURE 9d) each approximately linear, each "curve" corresponding to a value of gate position.

Normally these are fixed for a given turbine. The gate-position control loop 100 is included so as to force the speed-load characteristics to be more linear, and to vary the slope of the "curves" $G_1$–$G_3$ at will. This is accomplished by adding a "gate error signal" to the normally present speed error.

Let it be supposed that a turbine, alone in a system, is subjected to a load. Let it be further assumed that if a normal (constant speed) control system were employed, then the gate would have to be opened to position $G_1$ in order to return the turbine to constant speed. But with the gate-error signal present there will be an additional component of the error signal such that if the gate position were $G_1$ the gate would tend to close and therefore the actual speed would be less than the constant nominal setpoint speed. As the gate retreats from $G_1$ the additional error signal due to gate position also decreases so that the final speed is stable. All of this is useful for the following reason:

The speed load characteristic of a given turbine can be used to determine the behavior of that turbine when employed in a system of more than one turbine. For example in FIGURE 9e, the characteristics of two turbines with identical set points but different speed-load slopes (percent droop) are drawn on the same axes. As seen from FIGURE 9d, the load accepted by the turbine of sharp slope is less than the load accepted by the turbine of smaller percent droop for a given speed $W_0$.

Returning to the case of a single turbine it should be noted that the speed-load characteristics are a family of characteristics wherein the curve applicable in any given circumstance depends upon the gate position at no-load.

The proposed system changes the slope of the curves (percent droop) independently of the no-load gate position.

This is desirable because in a system of many turbines the relation of percent droop among various turbines (assume constant no-load position) determines the relative apportionment of the system load between turbines, whereas the gate position at no-load (assuming that percent droops are unchanged) varies the total energy delivered to the system. See below:

$$\frac{a}{b} = \frac{c}{d} \quad \frac{\text{percent droop Turb. 2}}{\text{percent droop Turb. 1}}$$

$$a+b \quad c+d$$

$$\frac{a+b}{c+d} \quad \frac{G_1}{G_2}$$

For a system constrained to operate at $W_0$:
 $a$=load accepted by turbine 1 with gate setting $G_1$.
 $b$=load accepted by turbine 2 with gate setting $G_1$.
 $c$=load accepted by turbine 1 with gate setting $G_2$.
 $d$=load accepted by turbine 2 with gate setting $G_2$.
 $a+b$=total load delivered with gate setting $G_1$ on both turbines.
 $c+d$=total load delivered with gate setting $G_2$ on both turbines.

Thus through the use of the control loop 100 (to be further described) is is possible, through only a single adjustment, to adjust the percent droop of the associated turbine, and control the apportionment of the load among the plural turbines of a multi-turbine network.

Turning now to graph $b$ of FIGURE 9, let it be assumed that it is desired that the turbine 11 operates at an angular velocity $w_0$, which may for example, be 60 c.p.s. This is represented by the horizontal line 91. Let it now be assumed that the turbine 11 be developing an amount of energy $e_0$ to be transmitted to the load. The intersection between the values $w_0$ and $e_0$ is represented by the point 92. At this point, the relationship between energy and angular velocity is represented by the line 93 having a slope $p$. Let it now be assumed that an additional load is imposed upon the turbine so that the total energy which the turbine 11 must develop is at the point $e_1$, thus requiring the turbine 11 to develop an incremental energy $\Delta_e$. Accompanying this increase in energy requirement is a decrease in angular velocity $\Delta_w$ which is the difference between $w_0$ and $w_1$, which can be seen at the intersection of line 93, with the value $e_1$ at point 94.

By adding an increment of angular velocity $\Delta_w$ to turbine 11, this will cause the turbine 11 to generate the necessary added energy which it must put out, while remaining at the angular velocity $w_0$. In the prior art systems, this change could be performed by altering the set point, i.e., the voltage $e_s$ impressed at the input 16 of FIGURE 1, and further, by adjusting the gain of the relay valve means 22. These two adjustments were required to be performed in alternate succession in order to "zero in" to the desired operating condition.

Turning to graph $c$ of FIGURE 9, this is substantially identical to graph $b$ of FIGURE 9, with the exception of the line 93' having a slope $p'$ substantially different from the slope $p$ of line 93 in graph $b$. Considering the graph $c$, it can be seen that for the identical change in energy $\Delta_e$, there occurs a much smaller change in angular velocity $\Delta_w$. Thus, with a turbine 11 operating with a load line 93' of graph $c$, the accompanying speed change which turbine 11 must undergo to return to constant velocity $w_0$ becomes much less than that required with the turbine 11 operating under the load line 93 of graph $b$ in FIGURE 9.

Let it now be assumed that there exists a system (not shown) in which two turbines of the type shown in 11 are serving a network and that the energy requirements of the network are $e_0$. Suddenly the energy requirements of the load increase and with the turbines each having differing load lines 93 and 93' of the graphs $b$ and $c$, respectively, of FIGURE 9, this will cause the turbines to assume different proportions of the increased energy requirement in accordance with the slope with their load lines. Thus, it is possible by adjusting the load line to adjust the amount of increased energy which each turbine within the system may assume. While a system of two turbines has been described, it should be understood that systems having a greater number of turbines may be employed and this is actually the typical case. In addition, it should be understood that such systems may operate under conditions wherein energy is being fed back to the turbines. That is, there is an abrupt decrease in energy required by the load at which the system will operate equally well through either positive or negative excursions in load energy requirements.

Turning now to FIGURE 2, the energy or gate position and percentage permanent droop servo loop 100 is shown therein and is comprised of set point means 101 which develops a constant voltage at its output 101a, which is representative of the energy which it is desired for the turbine 11 to develop. The energy of the turbine 11 is fed to the load means 105. A double-headed arrow of line 106 represents the fact that energy to the load may abruptly increase or decrease and hence be considered as a flow of energy from turbine to load or from load to turbine.

The physical position of the piston in servo motor 23 (see element 79 of FIGURE 7) is utilized as a mechanical input to the position to voltage transducing means 102, which functions to develop an analog voltage which is proportional to the position of the gate of servo motor 23. The position of the gate, or piston 79 of mechanical servo motor 23, shown in FIGURE 7, is determinative of the amount of energy which will be developed by turbine 11. For example, if the gate is completely opened, this means that turbine 11 is transmitting all energy to the load. If the gate 79 is completely closed and the turbine 11 is operating, this means that energy is being delivered to the turbine 11 from the load 105. Thus, the position of the gate 79 is indicative of the direction of flow of energy between turbine 11 and load 105. Likewise, the abrupt change and direction of abrupt change of energy required by the load, or being given up by the load, may be equated to a change in the position of the servo motor gate 79.

To recognize this condition, the servo loop 100 is provided with sensing means 103, which simultaneously accepts the analog voltage outputs at 101a and 102a of the adjustable set point voltage means 101 and the position to voltage transducer means 102, respectively. Under normal circumstances, with no change in the gate position of servo motor 23, the analog voltages developed by 101 and 102 will be equal, causing the output at 103a to be zero. This output is impressed on control means 104, which integrates the output of 103 and controls its gain for the purpose of de-sensitizing the servo loop 100 to transient voltages. The constant gain and integrator circuit 104 may be eliminated, if desired. The output is ultimately impressed upon one input winding (not shown) of the magnetic amplifier 36 and may be summed with the output of filter means 35 to ultimately control the operation of servo motor 23, in order to readjust operation of the system to return turbine 11 to constant angular velocity operation.

Sensing means 103 is made adjustable and may represent any load line such as, for example, the load lines 93 and 93' of FIGURE 9, so as to enable the turbine 11 which it controls to accept any desired portion of the change in load energy requirements.

FIGURE 10 is a schematic showing the servo loop 100 in greater detail. As shown therein, the mechanical output of servo motor 23 operates the position to analog voltage transducer 102, such that the mechanical linkage represented by dashed line 107 controls the position of movable arm 108 along the length of resistor 109. By so positioning arm 108 the voltage output of transducer 102 may lie between a voltage $+V$ and ground. The output of transducer 102 is impressed upon sensing means 103. The set point means 101 is comprised of a movable arm 110, adjustable relative to resistance 111, so that the set point output can develop any voltage from $+V$ to ground potential. The output of the set point voltage means 101 is impressed upon the other input of sensing means 103.

Sensing means 103 is comprised of a series connected adjustable resistance means 112 and winding 113, provided on magnetic amplifier 36. The operation of the servo loop 100 is as follows:

Let it first be assumed that the analog output voltages of 101 and 102 are equal. Let it now be assumed that an abrupt change in the load energy requirements takes place. This is reflected in a change in the gate position of servo means 23 causing arm 108 to undergo a change in physical position. This causes the voltage output of 102 to change. Since the set point voltage 101 does not change, a voltage $\Delta V$ is developed across the input terminals of the sensing means 103. The current I flowing through the series circuit of sensing means 103 is equal to $\Delta V$ divided by K, such that $$\frac{I}{\Delta V}=\frac{1}{K}=\frac{\text{gate position change}}{\text{electrical error}}$$

The quantity 1, divided by K, represents the load lines 93 or 93', shown in FIGURE 9. By adjusting the magnitude of the resistance element 112, this determines the value of the quantity $1/K$, or the slope of the load line for the turbine. By adjustment of adjustable resistance 112, this determines the proportion of the current I impressed upon the magnetic amplifier 36 and hence, ultimately upon the turbine 11. By adjusting each adjustable resistor 112 of each turbine within the system network by differing amounts, this enables each of the turbines to assume different proportions of the change in energy requirements. The percentage permanent droop is given by $$P \text{ (in percent)} = \frac{\Delta W}{W} \times 100$$

Thus by adjusting the magnitude of the variable resistance 112, the load line of the turbine 11 may for example, be changed from 93' to 93, or conversely, from 93 to 93', which causes a change in the $\Delta_w$, thereby causing an accompanying change in percent permanent droop.

The servo loop 100 of FIGURES 2 and 10 may be employed either in conjunction with the other servo loops, shown in FIGURE 2, or may be employed separately. In the case where servo loop 100 is employed in conjunction with the other servo loops, it is provided with a winding 113 on the magnetic amplifier 36 which may, for example, be comprised of a magnetic core 114 having the winding 113 and input winding 115 for the output of filter 35 and an output winding 116 to impress the sum of the inputs upon the spool electromagnet 20. The single adjustment of the variable resistance means 112 performs the function of controlling the gate position of servo means 23 and the percent permanent droop simultaneously with the one adjustment, which factors previously necessitated two separate control means in prior art devices. Also, the use of solid-state circuitry has the distinct advantages of being readily adaptable to remote control and computer control systems; providing a higher degree of accuracy; providing explicit as opposed to implicit indications of great action.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Electronic control means for regulating the speed of turbines and the like, comprising first means for sensing the speed of the turbine; said first means generating first and second complementary error signals; second means receiving said complementary error signals for generating an output suitable to adjust the speed of the turbine to the desired level; said first error signal being diverted through first, second and third paths between said first means and said second means; said first path connecting said first means to said second means; said second path comprising integrating means; said third path comprising differentiator means.

2. Electronic control means for regulating the speed of turbines and the like, comprising first means for sensing the speed of the turbine; said first means generating first and second complementary error signals; second means receiving said complementary error signals for generating an output suitable to adjust the speed of the turbine to the desired level; said first error signal being diverted through first, second and third paths between said first means and said second means; said first path connecting said first means to said second means; said second path comprising integrating means; said second means comprising first amplifier means having a plurality of inputs for receiving signals from said plural paths; second amplifier means for receiving said second error signal.

3. Electronic control means for regulating the speed of turbines and the like, comprising first means for sensing the speed of the turbine; said first means generating first and second complementary error signals; second means receiving said complementary error signals for generating an output suitable to adjust the speed of the turbine to the desired level; said first error signal being diverted through first, second and third paths between said first means to said second means; said second path comprising integrating means; said second means comprising first amplifier means having a plurality of inputs for receiving signals from said plural paths; second amplifier means for receiving said second error signal; solenoid means having first and second inputs for receiving signals from said first and second amplifier means; said solenoid means comprising armature means reciprocally movable under control of said solenoid means input signals.

4. Electronic control means for regulating the speed of turbines and the like, comprising first means for sensing the speed of the turbine; said first means generating first and second complementary error signals; second means receiving said complementary error signals for generating an output suitable to adjust the speed of the turbine to the desired level; said first error signal being diverted through first, second and third paths between said first means to said second means; said second path comprising integrating means; said second means comprising first amplifier means having a plurality of inputs for receiving signals from said plural paths; second amplifier means for receiving said second error signal; solenoid means having first and second inputs for receiving signals from said first and second amplifier means; said solenoid means comprising armature means reciprocally movable under control of said solenoid means input signals; relay valve means controlled by said armature means for adjusting the speed of the turbine.

5. Error sensing means for generating signals representative of a deviation between a selected operating level and the actual operating level of a rotating device comprising first means for generating a predetermined number of pulses per revolution of the rotating device; reversible counter means; second means for establishing a predetermined binary count in said reversible counter means upon the receipt of each pulse from said first means; oscillator means for reducing the count in said counter means; register means for storing the resulting count in said counter means upon receipt of the next pulse from said first means; fourth means connected to said register means for generating complementary analog signals from said count converting said resulting count into first and second complementary analog signals.

6. Error sensing means for generating signals representative of a deviation between a selected operating level and the actual operating level of a rotating device comprising first means for generating a predetermined number of pulses per revolution of the rotating device; reversible counter means; second means for establishing a predetermined binary count in said reversible counter means upon the receipt of each pulse from said first means; oscillator means for reducing the count in said counter means; register means for storing the resulting count in said counter means upon receipt of the next pulse from said first means; fourth means connected to said register means for generating complementary analog signals from said count converting said resulting count into first and second complementary analog signals; said fourth means comprising first and second binary resistor groups; first and second electronic switch groups associated with said first and second binary resistor groups; one of said electronic switch groups operating in complementary fashion to the remaining switch group; both of said switch groups being controlled by said register means; each of said electronic switch groups being selectively closed to generate an analog signal related to the count in said register means.

7. Error sensing means for generating signals representative of a deviation between a selected operating level and the actual operating level of a rotating device comprising first means for generating a predetermined number of pulses per revolution of the rotating device; reversible counter means; second means for establishing a predetermined binary count in said reversible counter means upon the receipt of each pulse from said first means; oscillator means for reducing the count in said counter means; register means for storing the resulting count in said counter means upon receipt of the next pulse from said first means; fourth means connected to said register means for generating complementary analog signals from said count converting said resulting count into first and second complementary analog signals; said first means being a magnetic pickup means; said rotating device being provided with a shaft having evenly spaced teeth about its circumference; said magnetic pickup means being positioned adjacent said shaft to generate pulses upon rotation of said shaft.

8. Error sensing means for generating signals representative of a deviation between a selected operating level and the actual operating level of a rotating device comprising first means for generating a predetermined number of pulses per revolution of the rotating device; reversible counter means; second means for establishing a predetermined binary count in said reversible counter means upon the receipt of each pulse from said first means; oscillator means for reducing the count in said counter means; register means for storing the resulting count in said counter means upon receipt of the next pulse from said first means; fourth means connected to said register means for generating complementary analog signals from said count converting said resulting count into first and second complementary analog signals; delay means connected between said first means and said set point means for delaying the reset of said reversible counter means after the count therein has been shifted into said register means.

9. Electronic control means for regulating the speed of turbines and the like, comprising first means for sensing the speed of the turbine; said first means generating first and second complementary error signals; second means receiving said complementary error signals for generating an output suitable to adust the speed of the turbine to the desired level; said first error signal being diverted through first, second and third paths between said first means and said second means; said first path connecting said first means to said second means; said second path comprising integrating means; said second means comprising first amplifier means having a plurality of inputs for receiving signals from said plural paths; second amplifier means for receiving said second error signal; said first and second amplifier means being magnetic amplifiers.

10. Electronic control means for regulating the speed of turbines and the like, comprising first means for sensing the speed of the turbine; said first means generating first and second complementary error signals; second means receiving said complementary error signals for generating an output suitable to adjust the speed of the turbine to the desired level; said first error signal being diverted through first, second and third paths between said first means and said second means; said first path connecting said first means to said second means; said second path comprising integrating means; said second means comprising first amplifier means having a plurality of inputs for receiving signals from said plural paths; second amplifier means for receiving said second error signal; said first amplifier means being a magnetic amplifier.

11. Electronic control means for regulating the speed of turbines and the like, comprising first means for sensing the speed of the turbine; said first means generating first and second complementary error signals; second means receiving said complementary error signals for generating an output suitable to adjust the speed of the turbine to the desired level; said first error signal being diverted through first, second and third paths between said first means and said second means; said first path connecting said first means to said second means; said second path comprising integrating means; said second means comprising first amplifier means having a plurality of inputs for receiving signals from said plural paths; second amplifier means for receiving said second error signal; said first amplifier means being a magnetic amplifier; said magnetic amplifier having a plurality of input windings for respectively receiving signals from said three paths.

12. Electronic control means for regulating the speed of turbines and the like, comprising first means for sensing the speed of the turbine; said first means generating first and second complementary error signals; second means receiving said complementary error signals for generating an output suitable to adjust the speed of the turbine to the desired level; said first error signal being diverted through first, second and third paths between said first means and said second means; said first path connecting said first means to said second means; said second path comprising integratnig means; said second means comprising first amplifier means having a plurality of inputs for receiving signals from said plural paths; second amplifier means for receiving said second error signal; said first amplifier means being a magnetic amplifier; said magnetic amplifier having a plurality of input windings for respectively receiving signals from said three paths; and at least one additional input winding; adjustable dither means for impressing a sinusoidal signal upon said additional input winding to provide loop gain adjustment for proper stability margin.

References Cited
UNITED STATES PATENTS

| | | | |
|---|---|---|---|
| 3,274,443 | 9/1966 | Eggenberger | 217—5 |
| 2,960,629 | 11/1960 | Oldenburger | 217—5 |
| 2,977,768 | 4/1961 | Wagner | 137—26 X |
| 3,097,488 | 7/1963 | Eggenberger | 137—26 X |
| 3,097,489 | 7/1963 | Eggenberger | 137—27 X |
| 3,187,223 | 6/1965 | Raeber | 317—5 |
| 3,226,558 | 12/1965 | Walker | 137—17 X |
| 3,238,376 | 3/1966 | Ernst | 137—26 |

CLARENCE R. GORDON, *Primary Examiner.*